Jan. 8, 1935.  E. A. GREEN  1,986,891
NUT AND RETAINER
Original Filed Feb. 2, 1929
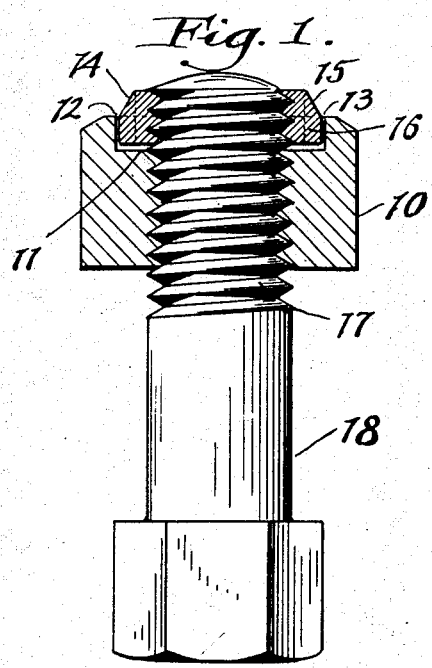
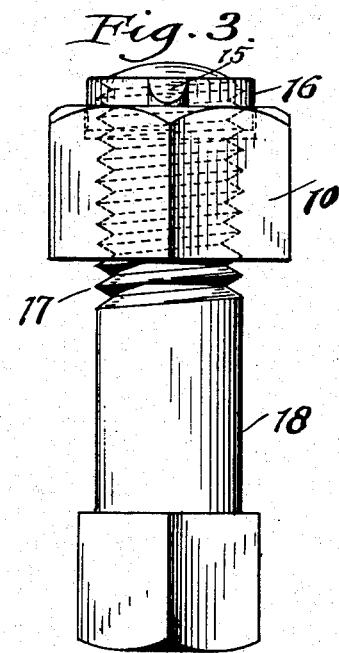
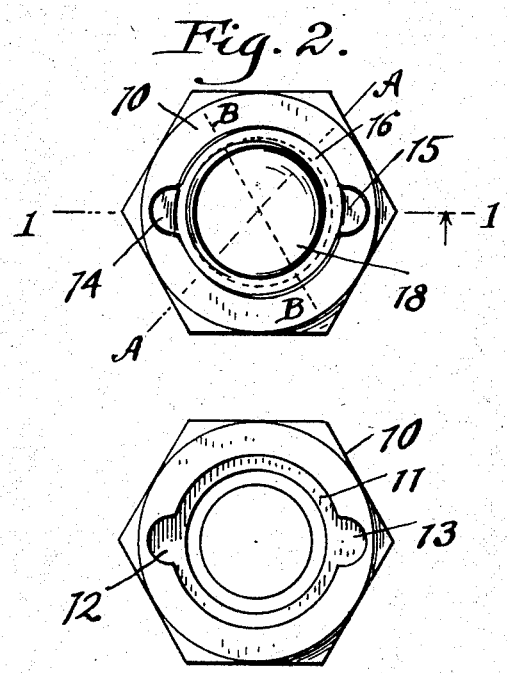
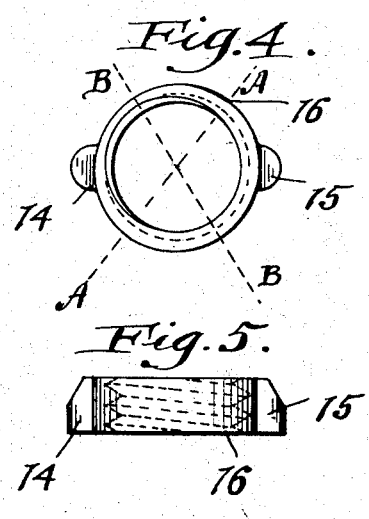
Inventor:
Edward A. Green
Kwis Hudson & Kent
Attys Patented Jan. 8, 1935

1,986,891

UNITED STATES PATENT OFFICE 1,986,891

NUT AND RETAINER

Edward A. Green, East Cleveland, Ohio

Application February 2, 1929, Serial No. 337,134
Renewed September 28, 1933

2 Claims. (Cl. 151—15)

This invention relates to a nut and its retainer for preventing the unintentional loosening, and permitting the intentional loosening, removal, or reapplication of the nut to the same or other bolts of similar specifications after it has been applied to a threaded bolt.

The retainer of the present invention is of the same type as those disclosed in Letters Patent Nos. 1,166,203 and 1,400,154, issued December 28, 1915, and December 13, 1921, respectively. In the retainers shown in these patents diametrically opposite portions of the retainer threads are brought closer together than the corresponding thread portions of the nut while the threaded portions of said retainer which are substantially at right angles to the threaded portions which are nearer together than the diameter of the true circular distance are separated or expanded, thus causing such first-named portions to maintain an effective frictional grip upon the threads of the bolt to which the retainer and nut are applied. The retainer disclosed in the first patent mentioned above is not permanently interlocked with the nut but is free to be removed from operative assembly therewith when the nut and retainer are not upon a bolt, while the retainer shown in the other of the above mentioned patents is permanently interlocked in assembled relationship with the nut by having portions of the nut peened over cooperating portions of the retainer to prevent axial removal of the same from the nut.

An object of the present invention is to provide a retainer whose total diametral resilience, within the elastic-limit of its material, is many times that of the range of its operating resilience, required for the adjusting of its minor thread-pitch-diameter to the various thread-pitch-diameters of commercial bolts; thus establishing very uniform pressures, therefore torque (wrenching or locking) values, for applications on both maximum thread-pitch-diameter bolts, and on minimum thread-pitch-diameter bolts, made in accordance with the manufacturing tolerances established by the National Screw Thread Commission; permitting thereby, complete interchangeability without appreciable variation in torque values—"locking-effect".

Another object is to so devise that the fiber stresses—within the elastic limit of a high elastic-limit steel—may be utilized to the fullest extent for producing, conjointly, maximum diametral resilience, and maximum diametral resistance to change of contour, in a retainer of substantially tubular—therefore resilient—section, for nut-lock purposes; also, to provide means, by proper expansion of its minor thread-pitch-diameter, whereby such retainer may automatically "take" the thread of any corresponding commercial bolt, and deliver relatively high thread-contact pressures upon application to a bolt of minimum thread-pitch-diameter manufactured within commercial tolerances.

Another object is to provide a substantially tubular, internally threaded, diametrically distorted, resilient retainer having compensating major and minor axes which, when assembled with its nut, is held in a predetermined relationship and in thread registry therewith, when the nut is not applied to a bolt, by means of its own inherent resilience.

Another object is to provide constant and automatic means, or "check", for determining a retainer of low "locking" efficiency.

Another object is to provide a retainer of such relative hardness that its application to and removal from commercial bolts will not cause injury and interfere with its removal, through seizure of their thread surfaces.

Additional objects and advantages will become apparent as the description of the invention proceeds.

In carrying out the invention and in accomplishing the desired objects, it is proposed to provide a retainer for use in combination with a nut having a counterbore in its crown face, which retainer has a high diametral resilience and is diametrally distorted so that the maximum outer diameter of the retainer and the minimum thread pitch diameter thereof are so related that the retainer will maintain itself assembled in the counterbore of the nut by the resilient reaction thereof against the wall of the counterbore in the direction of its maximum outer diameter and will frictionally grip the threads of a bolt to which the nut and retainer are applied diametrically on its minimum thread pitch diameter.

In the accompanying drawing, an embodiment of the invention is shown, wherein

Fig. 1 is a transverse vertical section taken approximately on the line 1—1 of Fig. 2 showing the nut and retainer applied to a bolt;

Fig. 2 is a top plan view of the nut and retainer applied to a bolt;

Fig. 3 is an elevational view of the nut and retainer applied to a bolt and taken from the right-hand side of Fig. 2;

Fig. 4 is a top plan view of the retainer;

Fig. 5 is a side elevational view thereof; and

Fig. 6 is a top plan view of the nut.

The nut 10 is shown as a hexagonal form of nut in the crown face of which is a counterbore 11. This counterbore is provided in diametrically opposite wall portions thereof with depressions or recesses 12 and 13. These recesses are substantially longitudinally split halves of drill bores arranged at opposite angles of the wrenching faces of the nut with centers substantially on the circle formed by the wall of the counterbore. These semi-circular depressions or recesses are of the same size and extend from the crown face of the nut to the bottom of the counterbore. The nut shown herein lends itself to inexpensive and rapid manufacture since the depressions or recesses 12 and 13 may first be drilled after which the counterbore 11 may be drilled so that it intersects the drill holes for the recesses, which operations, of course, may all be performed upon a multiple boring head. It is thus possible to convert standard tapped nuts into the recessed nuts by substantially a single operation.

The depressions or recesses 12 and 13 are for the purpose of receiving lugs or ears 14 and 15 formed on the tubular threaded retainer 16, which is adapted to be seated when in assembled position in the counterbore. The lugs or ears 14 and 15 are substantially semi-circular projections from diametrically opposite sides of the retainer 16. So far, the description of the nut and the retainer covers substantially the identical structure disclosed in the aforementioned Patent No. 1,400,154. In the patented construction, however, the retainer is maintained in assembled relationship with the counterbore of the nut by striking over portions of the crown face of the nut adjacent the depressions or recesses, so that they overlie the lugs or ears of the retainer and prevent the same from axial displacement except within definite limits of movement.

In the present invention it is proposed to so form the retainer itself that it will be maintained in assembled relationship with the counterbore of the nut by its own inherent resilience and will also be capable of frictionally gripping the threads 17 of a bolt 18 when the latter is threaded into the nut and retainer. Accordingly, the retainer 16 is formed of a suitable metal, such as chrome nickel steel, for example, hardened and tempered so as to increase its diametral resilience and its diametral resistance to radial distortion. The highly diametrally resilient retainer is of such a size that before distortion it will loosely fit within the counterbore of the nut, although it should not have any great amount of play therein. The retainer is then diametrally distorted so that its maximum outer diameter will lie substantially along the line A—A of Figs. 2 and 4, and will be substantially greater before assembly than the diameter of the counterbore. This distortion of the retainer causes its minimum diameter to lie along the line B—B of Figs. 2 and 4 and so reduces its thread pitch diameter as measured on its minimum diameter that such thread pitch diameter will be substantially less than the thread pitch diameter of the minimum standard bolt 18 to which the retainer and nut are applied and other corresponding diameters may be selected for similar distortion.

The distorted retainer is compressed in the direction of its maximum diameter or expanded in the direction of its minimum diameter to temporarily cause it to assume substantially its original circular shape during which time it is placed in the counterbore 11 of the nut 10 with the ears or lugs 14 and 15 of the retainer engaging the depressions or recesses 12 and 13 of the nut. When the stress is released, the high resilience of the retainer causes it to tend to return to its distorted shape but its arrangement in the counterbore results in restricting the maximum diameter of the distorted retainer to that of the counterbore so that the retainer contacts with the wall of the counterbore at these points, while the thread pitch diameter of the retainer measured on its minimum diameter is still appreciably less than the thread pitch diameter of the minimum commercial bolt used with the nut 10.

In assembling the retainer in the counterbore of the nut, the relationship of the nut threads and the retainer threads must be strictly observed in order that there may be no bearing engagement between the two members in a direction longitudinally of their common axis. The retainer should be so arranged that the threads thereof will not engage the threads of the bolt until after the threads of the nut completely engage with the threads of the bolt. An entering bolt will automatically and correctly register any relation of threads that in contact would lie between minus ¼ and ½ of a thread pitch or, in other words, such ratios as will furnish a separation of ¼ to ½ of a thread pitch between retainer and nut longitudinally of their axes when they are applied to a bolt. In this connection attention is called to Patent No. 1,166,203, mentioned above, wherein this relationship of the threads of the nut and retainer is set forth.

The retainer having been assembled in the counterbore of the nut will be held therein and in thread registry at such time or times as it is not applied to a bolt by means of its own inherent resilience reacting against the relative rigid wall of the counterbore. The diametrally distorted and diametrally resilient threaded retainer when assembled in the counterbore of the nut will deliver relatively high initial contact pressures upon application to a threaded bolt with a minimum diametral distortion. The diametral resilience or reaction of the retainer, measured in its minimum diameter, must be appreciably greater than the sum of its required expansions in this diameter due to its confinement in the counterbore of the nut, and, further, to its possible application to a maximum thread pitch diameter bolt. The increased diametral resilience enables the retainer to function satisfactorily on all bolts that have been threaded within the limits of commercial thread pitch diameters as well as interchangeably on all such bolts owing to its total diametral resilience range being many times greater than the range found in the pitch diameters of commercial bolts. The increased strength of the steel of which the retainer is formed, due to heat-treatment, produces, when the retainer is applied to a bolt, increased diametral reaction and, therefore, increased frictional effect providing amply for maximum service conditions. Where the bolt and retainer are of approximately the same hardness, there is a tendency of the threaded surfaces to "seize" and erode during application and removal of the retainer owing to the high pressures obtained. There is no such tendency, however, where the retainer is harder than the bolt, and applications may be made repeatedly without injury to the threaded surface of either member. Therefore, the thread pitch diameters remaining the same, no appreciable reduction of torque effect is noted after repeated applications and removals of the retainer. It will be obvious that the related diametral construction provides an absolute and permanent check on the efficiency of the retainer since, if it is not distorted sufficiently to properly grip a thread, it cannot maintain itself in the counterbore of the nut.

The invention is susceptible of various modifications and adaptations within the scope of the appended claims.

Having thus described my invention, I claim:

1. In combination with a nut having a counterbore in one of its end faces, a diametrally resilient threaded retainer therefor arranged in said counterbore and located at all times entirely outwardly of the plane of the inner end face of the nut, said retainer being diametrally distorted and having a maximum outer diameter after distortion but before assembly substantially greater than the diameter of the counterbore of the nut and a thread pitch diameter measured on its minimum diameter substantially less than the thread pitch diameter of the minimum standard bolt to be used with the nut whereby after the retainer has been placed in assembled position in the counterbore it will be held therein when the nut is not applied to a bolt by its inherent resilience reacting against the wall of the counterbore, and will grip in a radial direction and diametrically on its minimum diameter the threads of a bolt to which the nut and retainer may be applied, and cooperating means on the nut and retainer to maintain said members against relative rotation.

2. In combination with a nut having a counterbore in its outer or crown face, a diametrally distorted and diametrally resilient threaded tubular retainer arranged in said counterbore, the maximum outer diameter of the retainer and the minimum thread pitch diameter thereof being so related that the retainer maintains itself assembled in the counterbore when the nut is not applied to a bolt by its resilient reaction against the wall of the counterbore in the direction of its maximum outer diameter and frictionally grips in a radial direction and diametrally on its minimum thread pitch diameter the threads of a minimum standard bolt to which the nut and retainer may be applied, and cooperating means on the nut and retainer to maintain said members against relative rotation.

EDWARD A. GREEN.